(12) United States Patent
Dickson et al.

(10) Patent No.: US 8,610,395 B2
(45) Date of Patent: *Dec. 17, 2013

(54) BATTERY CHARGING APPARATUS

(71) Applicants: Patrick Dickson, Florence, OR (US);
Rob Bronson, Lompoc, CA (US)

(72) Inventors: Patrick Dickson, Florence, OR (US);
Rob Bronson, Lompoc, CA (US)

(73) Assignee: Moto Boost International, LLC,
Florence, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/868,962

(22) Filed: Apr. 23, 2013

(65) Prior Publication Data

US 2013/0249487 A1 Sep. 26, 2013

Related U.S. Application Data

(63) Continuation of application No. 12/497,452, filed on Jul. 2, 2009, now Pat. No. 8,456,130, which is a continuation-in-part of application No. 11/561,866, filed on Nov. 20, 2006, now Pat. No. 7,573,230.

(60) Provisional application No. 60/738,329, filed on Nov. 18, 2005.

(51) Int. Cl.
*H02J 7/00* (2006.01)

(52) U.S. Cl.
USPC .......................................... 320/104; 320/107

(58) Field of Classification Search
None
See application file for complete search history.

(56) References Cited

U.S. PATENT DOCUMENTS

| | | | |
|---|---|---|---|
| 2003/0211382 A1* | 11/2003 | Aoyama | 429/96 |
| 2010/0055549 A1* | 3/2010 | Corder | 429/97 |
| 2011/0212348 A1* | 9/2011 | Yasui et al. | 429/7 |

* cited by examiner

*Primary Examiner* — Vinh Nguyen
(74) *Attorney, Agent, or Firm* — Cotman IP Law Group, PLC; Obi Iloputaife

(57) ABSTRACT

An apparatus for charging an automobile battery is presented. The device provides a surface charge with a time limited window in which to start a vehicle. Use of used batteries provides for environmentally effective manner in which to deal with the tremendous amount of used batteries that are discarded worldwide each year. The apparatus may optionally include a charging circuit to allow for recharging the used batteries. An LED display may be included to provide indication when a target battery has sufficient surface charge to warrant an attempt to start an engine. The apparatus is a small portable device that can be stored anywhere in a vehicle.

16 Claims, 11 Drawing Sheets

100

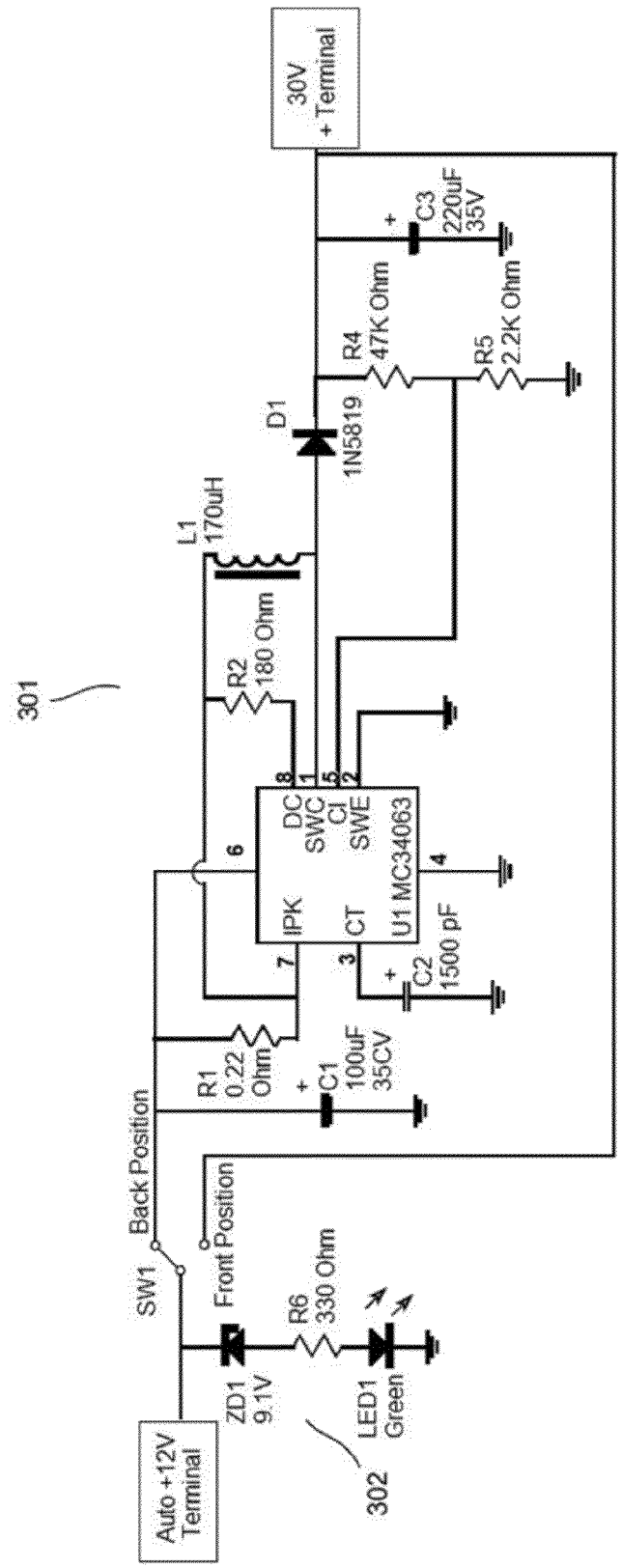

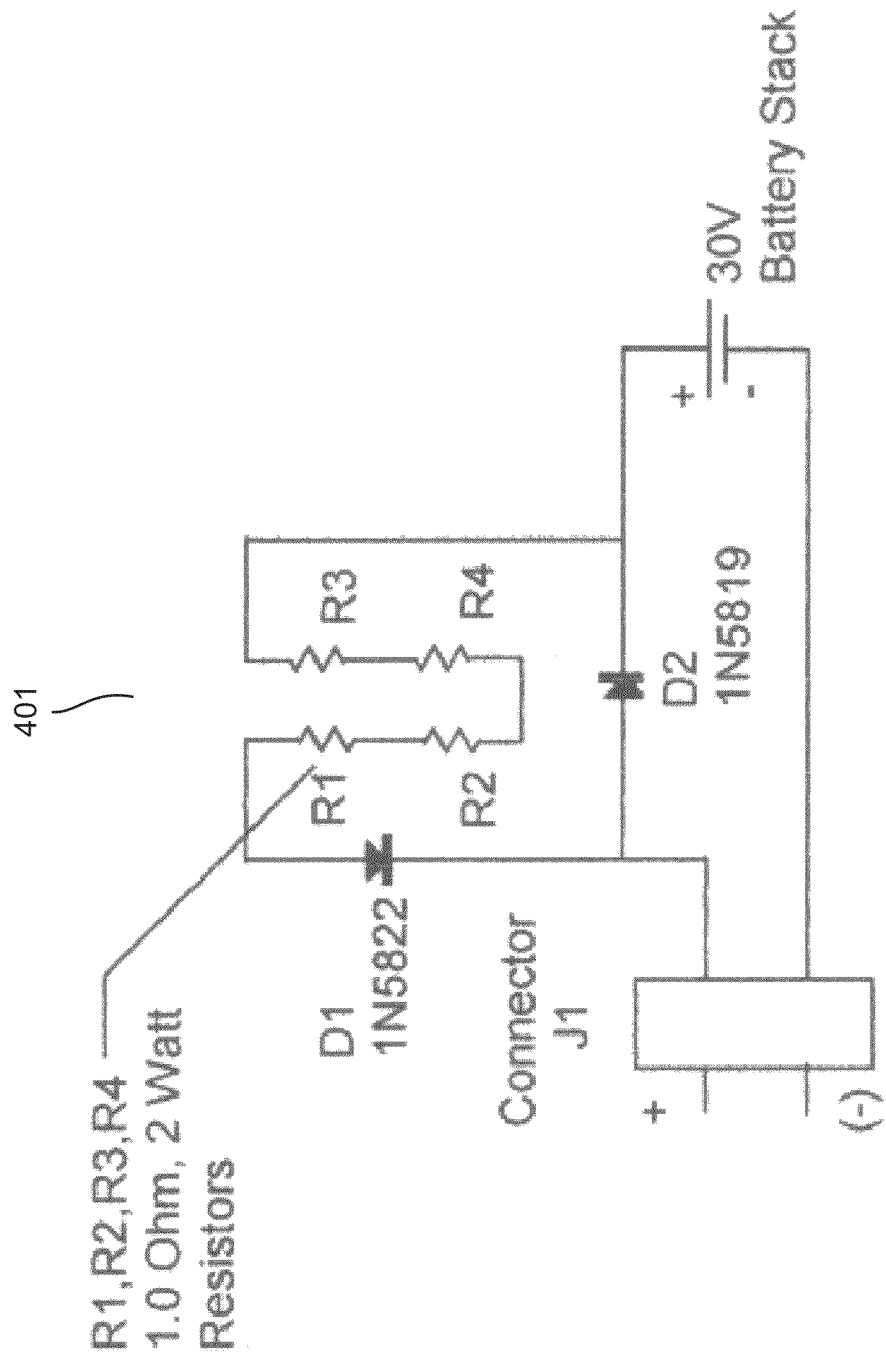

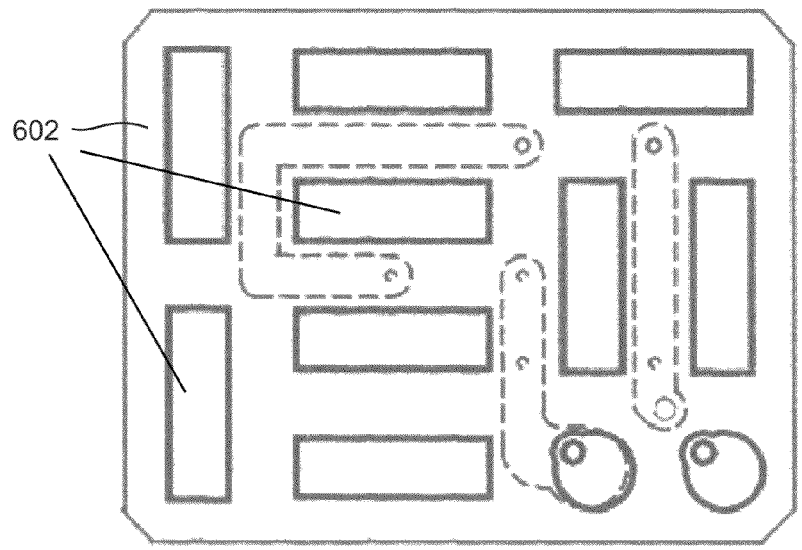
FIG. 6
SIDE A
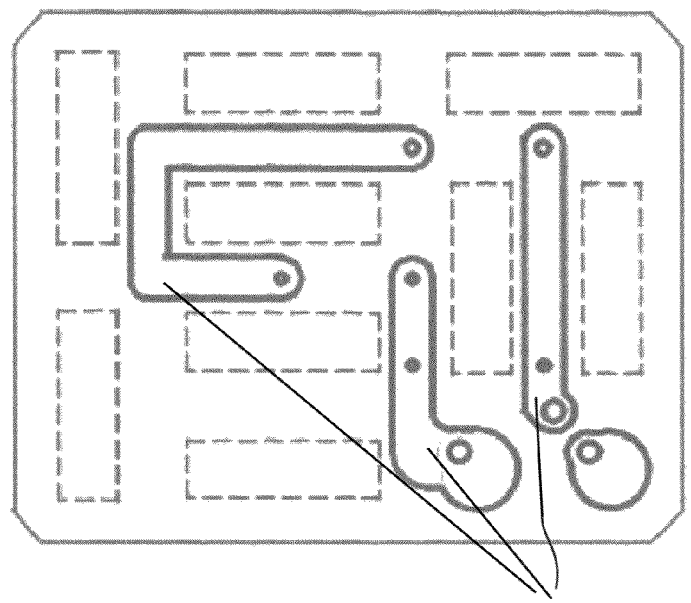
SIDE B

BATTERY CHARGING APPARATUS

CROSS REFERENCE TO RELATED APPLICATIONS

This is a continuation of U.S. patent application Ser. No. 12/497,452 filed on Jul. 2, 2009, now U.S. Pat. No. 8,456,130, which is a continuation-in-part of U.S. patent application Ser. No. 11/561,866 filed on Nov. 20, 2006, which is hereby incorporated by reference in its entirety into this specification. That application claims priority to a U.S. Provisional patent application which is co-owned by a common assignee. That provisional application is Ser. No. 60/738,329 filed on Nov. 18, 2005, the specification of which is also hereby incorporated herein by reference.

BACKGROUND OF THE INVENTION

1. Field of the Invention

Embodiments of the invention described herein pertain to the field of electrical systems. More particularly, but not by way of limitation, one or more embodiments of the invention comprise for example used household batteries to surface charge a car battery for a limited time to enable the battery to start an engine.

2. Description of the Related Art

Existing solutions allow for a battery source to provide a surface charge to a battery. Once the surface charge exists on the battery, there is a limited amount of time in which the battery may be used to start an engine in a vehicle. If the battery in the vehicle has been run down by an energy drain (for example by leaving the head lights on), a quick surface charge usually provides enough energy to start the engine in the vehicle. Existing solutions use new batteries to charge a target battery, such as, for example, an automobile battery. The use of new batteries is not environmentally friendly since there are existing used batteries that could be used to charge a target battery, however the related art does not contemplate the use of used batteries for this purpose.

On a global scale there are millions of non-rechargeable batteries used every year that are simply discarded, for example AA batteries. The environmental impact is tremendous in that many types of batteries contain harmful toxic chemicals that eventually leak into the environment. It is currently illegal to use mercury in most battery types so the environmental impact is no longer as great as it used to be. However, there are significant chemical resources in the multitude of discarded batteries that are simply discarded but which could be recycled. It is estimated that over 350 million rechargeable batteries are purchased in the United States every year. Even so, these batteries do not last forever and many are eventually discarded as well.

Alkaline batteries manufactured and sold in the United States are generally labeled with warnings that state that the batteries in any size are not rechargeable and users are warned against recharging the batteries. Some manufacturers have designed specific alkaline batteries for rechargeable use, but those batteries are sold at a higher premium price and are only rechargeable with the aid of the manufacturer's charging system. The design of these specific "rechargeable" alkaline batteries is supposed to be different than the typical alkaline batteries sold in high volume in most stores around the world. However, most alkaline batteries are "use once and discard" products that pose a significant environmental hazard.

U.S. Pat. No. 5,883,491, entitled "method and apparatus for depositing an electrical charge to an electrical storage cell used in an automobile," describes the basic functions associated with providing a surface charge to a battery. The energy source described in the '491 patent may comprise a variety of electrical sources; however using used batteries for this purpose is not contemplated.

For at least the limitations described above there is a need for applications of used batteries so that these batteries are not discarded into the environment and hence there is a need for a method and apparatus comprising used batteries for surface charging an automobile battery.

BRIEF SUMMARY OF THE INVENTION

One or more embodiments of the invention enable a method and apparatus comprising used batteries for surface charging an automobile battery. The apparatus comprises at least one used battery inserted into a case that is coupled with a target battery to provide a surface charge to the battery, for example to start a vehicle with a drained battery. Types of used batteries that may be utilized in embodiments of the invention include alkaline/alkaline manganese, zinc carbon/carbon zinc, zinc air, silver oxide/silver, lithium, nickel cadmium, nickel metal hydride, lithium ion and small sealed lead acid batteries. Many of these batteries comprise materials that are not environmentally friendly.

The apparatus case is sealed with a case top. The seal may include a tongue and groove coupling or any other type of sealing mechanism. Inside the case, a circuit board and a panel on opposing sides of the at least one used battery provide for connecting the at least one used battery in series. The circuit board may be constructed using any type of material utilized in circuit board construction, for example epoxy-glass laminates or cardboard or any other material. A compressive insert may be utilized to provide force sufficient to hold the at least one used battery against the circuit board and the panel. An electrical connector coupled with the case top provides a positive lead and a negative lead coupled with the at least one used battery and provides for an interface with a target battery, such as an automotive battery. Fuses may be utilized to protect the apparatus from too high of a current load and may be utilized in any portion of the circuit in keeping with the spirit of the invention.

One or more embodiments of the invention comprise at least one resistor in series with the positive lead. The at least one resistor is configured to limit current from the at least one used battery to the target battery. This limiting effect slows the time that it takes to charge the target battery but allows for lower heat to be generated, albeit over a longer period of time. By limiting the heat generated, a measure of safety is provided. By utilizing some of the at least one used batteries as heat sinks, the speed at which a surface charge may be deposited into the target battery may be increased. The at least one resistor may be placed against one more used batteries to increase the thermal transfer rate. The at least one resistor may be enclosed in a thermally conductive material that is electrically insulating to provide for efficient thermal transfer with an additional measure of safety. In other embodiments of the invention, the resistors may be mounted on the circuit board or outside the case.

The at least one battery in the case may form a series of batteries that are in contact with both the panel and circuit board. The panel may be flexible so that differences in battery heights may be accounted for. The compressive insert may be foam based or may comprise any other material(s) that provide a spring-like capability that forces the battery ends onto the respective conductive lines/paths that exist on the panel and circuit board.

In addition, the apparatus may comprise a switch that allows for manual connection of the at least one used battery to the target battery. The switch may also be used to connect the target battery to an LED to display a status indicator showing whether the target battery comprises a sufficient charge to warrant an attempt to start the vehicles engine that is coupled to the target battery for example. The apparatus may also comprise a charging circuit and the switch may be used in any combination with the connection to the target battery or LED or charging circuit. Alternatively, in a non-switch embodiment, the electrical circuit in the apparatus may automatically charge the target battery or may charge the at least one used battery, depending on the voltages presented to the apparatus.

The apparatus may also comprise a protection circuit that protects the at least one used battery from a maximum charging current when the charging circuit is used. This may be accomplished with a low wattage diode, for example, that may form an open circuit when too much current flows through it.

Although any type of used battery may be utilized in the apparatus, non-rechargeable alkaline batteries may be utilized in a limited number of recharge cycles. If carefully charged according to this method, non-rechargeable alkaline batteries may comprise the at least one used battery of the apparatus. Whether recharged or not, if each of the at least one used batteries inserted into the apparatus comprises a charge of at least 1.2 volts, then generally enough voltage will be present for the batteries to be used in embodiments of the invention. Thus, batteries at the end of their life to be utilized in an application where normally these batteries would be discarded. Further embodiments of the invention are detailed in the detailed description below.

BRIEF DESCRIPTION OF THE DRAWINGS

The above and other aspects, features and advantages of the invention will be more apparent from the following more particular description thereof, presented in conjunction with the following drawings wherein:

FIG. 3A is an electrical schematic for an embodiment of the invention comprising a charging circuit for charging an automobile battery via used batteries.

FIG. 4 is an electrical schematic for a protection circuit for limiting the current flow to and from the used batteries.

FIG. 6 shows an embodiment of both sides of the circuit board, allowing for conductive lines to form a series configuration of the at least one used batteries.

DETAILED DESCRIPTION

A method and apparatus comprising used batteries for surface charging an automobile battery will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
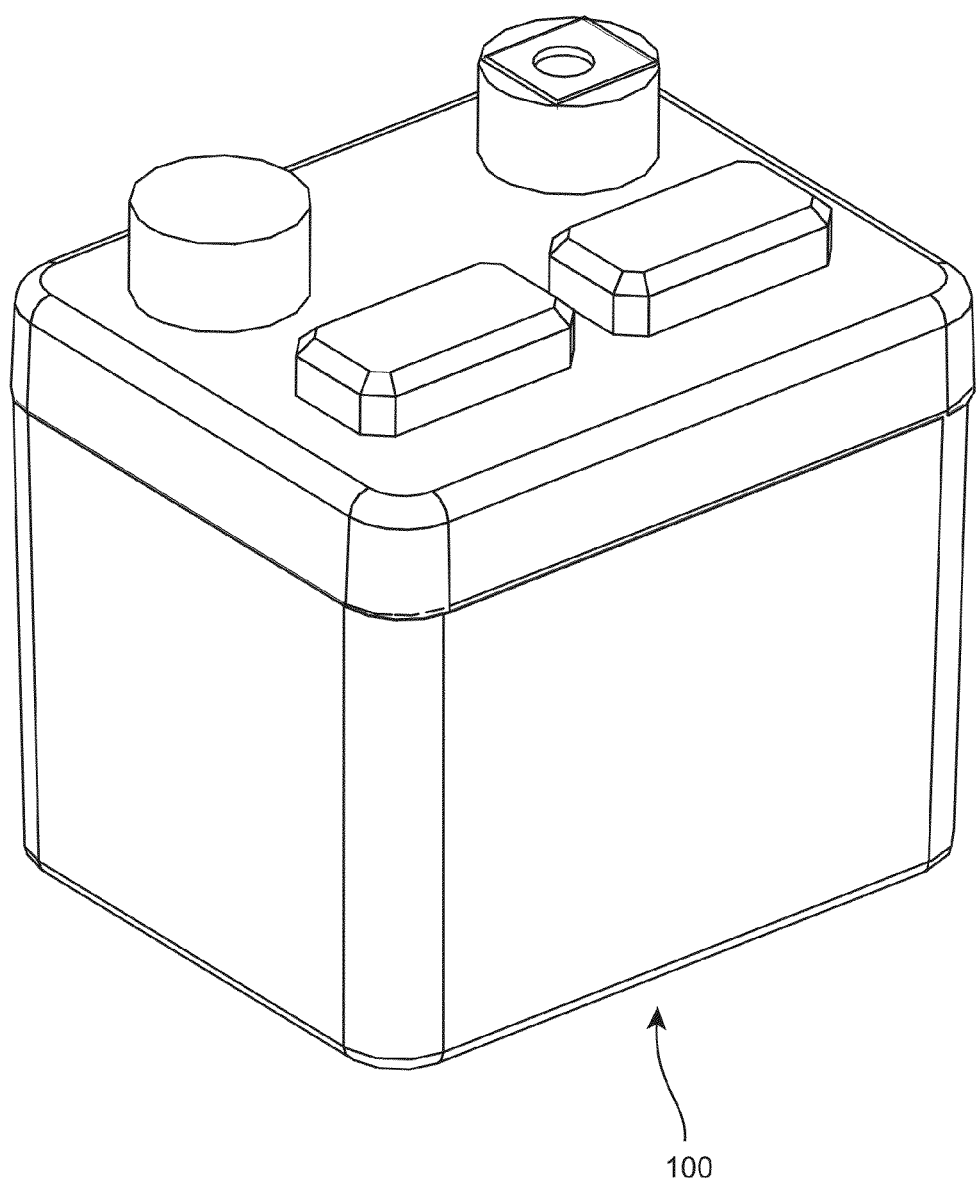
FIG. 1 is an isometric view of an embodiment of the apparatus formed into a case mimicking the shape of an automotive battery.

FIG. 1 is an isometric view of an embodiment of the invention 100 formed into a case mimicking the shape of an automotive battery. Any shape may be used for the case top. One or more embodiments of the invention enable a method and apparatus comprising used batteries for surface charging an automobile battery.

Figure 2:
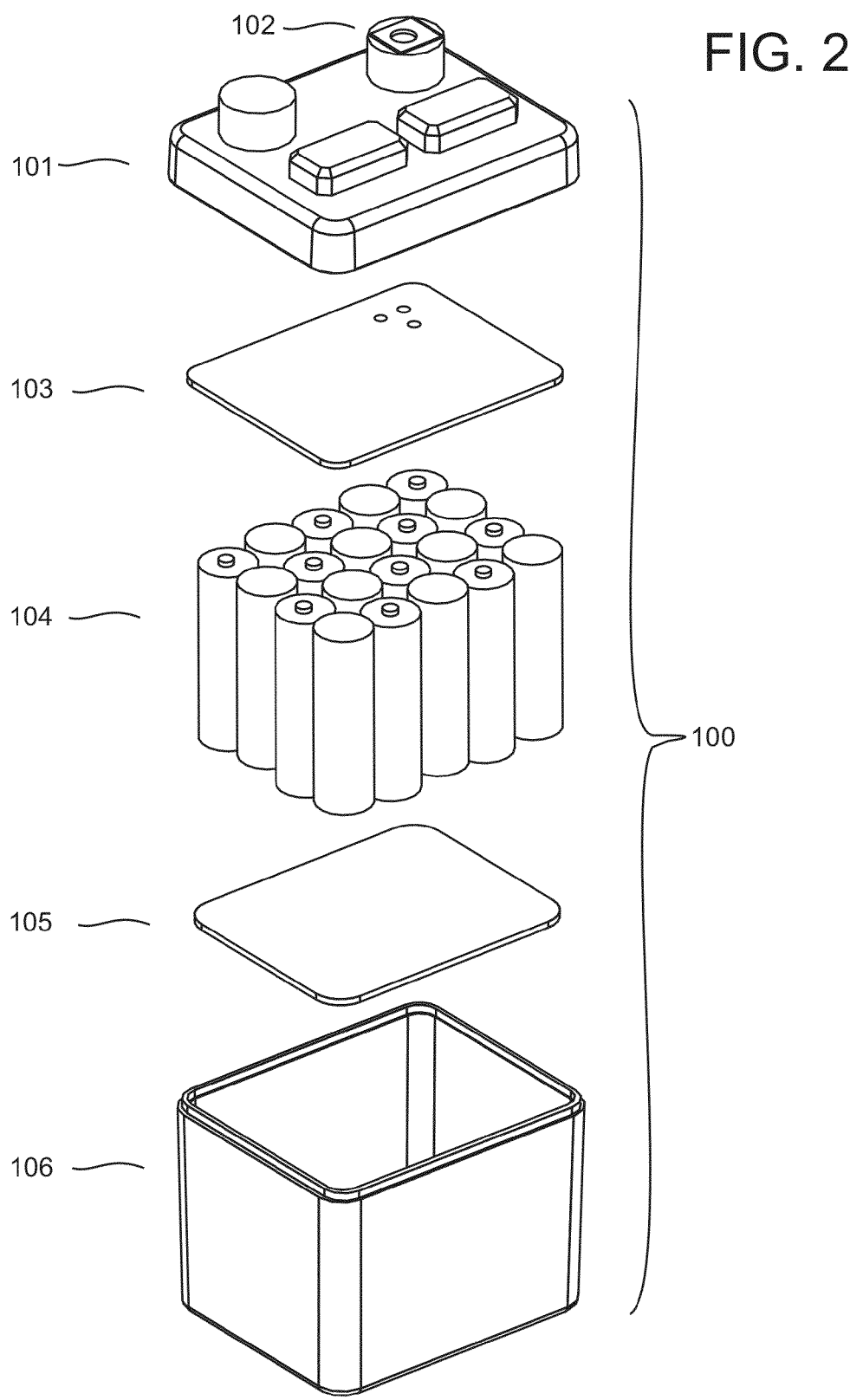
FIG. 2 is an exploded view of an embodiment of the apparatus.

FIG. 2 is an exploded view of an embodiment of the apparatus. The apparatus comprises at least one used battery 104 inserted into case 106 that is coupled with a target battery to provide a surface charge to the battery, for example to start a vehicle with a drained battery. Types of used batteries that may be utilized in embodiments of the invention include alkaline/alkaline manganese, zinc carbon/carbon zinc, zinc air, silver oxide/silver, lithium, nickel cadmium, nickel metal hydride, lithium ion and small sealed lead acid batteries. Many of these batteries comprise materials that are not environmentally friendly. The apparatus case is sealed with case top 101. Inside case 106, circuit board 103 and panel 105 on opposing sides of the at least one used battery 104 provide for connecting the at least one used battery in series. A compressive insert may be utilized to provide force sufficient to hold the at least one used battery against circuit board 103 and panel 105. The compressive insert may form a part of circuit board 103 or panel 105 or be placed on the opposing side of circuit board 103 or panel 105 with respect to at least one battery 104. Panel 105 may be rigid or flexible. Electrical connector 102 coupled with case top 101 provides a positive lead and a negative lead coupled with at least one used battery 104 and provides for an interface with a target battery (for example a lighter plug or leads to fit on the target battery for example).

Figure 3B:
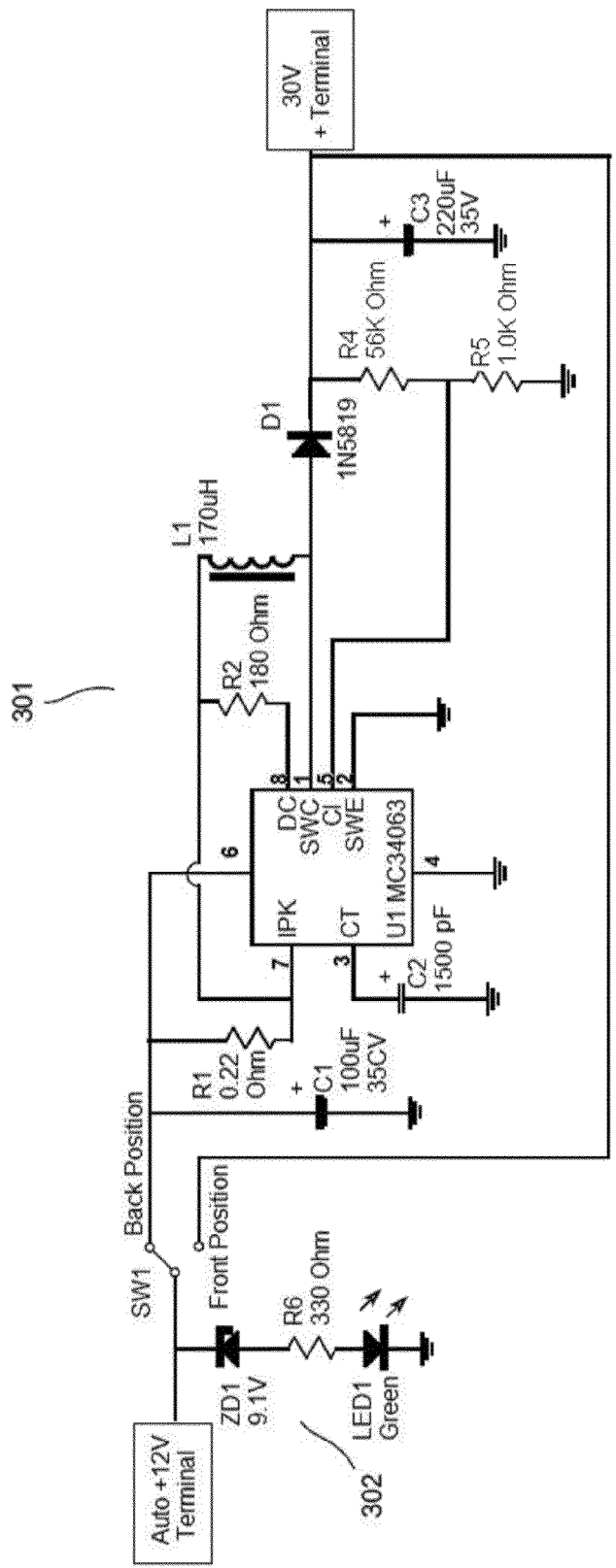
FIG. 3B is an electrical schematic for an embodiment of the invention comprising a charging circuit for charging an automobile battery via used batteries at a different rate than the embodiment shown in FIG. 3A.

One or more embodiments of the invention allow for charging a target battery and recharging used batteries. FIG. 3A is an electrical schematic for an embodiment of the invention comprising charging circuit 301 for charging a target battery with used batteries and visa versa. When switch SW1 is set to the "back position", current can flow from the target battery (shown on the far left) through the inductor L1 at the voltage regulated by U1. U1 in this embodiment is an MC34063 voltage regulator. Any other circuit for limiting the charging voltage and current may be used in place of charging circuit 301. Status circuit 302 comprising LED LED1 is shown at the left of the figure and is optional. Status circuit 302 shows a light when the target battery comprises a voltage greater than Zener diode ZD1 (for example 9.1 volts) added to the forward voltage drop across LED LED1 (typically about 1.5 volts). The embodiment shown in FIG. 3A utilizes a 47K Ohm resistor for R4 and a 2.2K Ohm resistor for R5. FIG. 3B utilizes different values for resistors R4 and R5, namely 56K Ohm and 1.0K Ohm respectively which alters the rate of charging the used batteries. Any other values for charging the used batteries are in keeping with the spirit of the invention. When switch SW1 is in the "front" position, then charging of the target battery takes place wherein the circuit of FIG. 4 is coupled with the "30 volt Terminal" on the right side of FIGS. 3A-B.

FIG. 4 is an electrical schematic for a protection circuit for limiting the current flow to and from the used batteries. One or more embodiments of the invention comprise at least one resistor R1 through R4 in this example that is/are in series with the positive lead. For example hooked in series with electrical connector 102 as per FIG. 1. The at least one resistor is configured to limit current from the at least one used battery to the target battery when current flows through the top portion of the circuit as per diode D1. This limiting effect slows the time that it takes to charge the target battery but allows for lower heat to be generated, albeit over a longer period of time. By limiting the heat generated, a measure of safety is provided. By utilizing some of the at least one used batteries as heat sinks, the speed at which a surface charge may be deposited into the target battery may be increased. The at least one resistor may be placed against one more used batteries to increase the thermal transfer rate. The at least one resistor may be enclosed in a thermally conductive material that is electrically insulating to provide for efficient thermal transfer with an additional measure of safety. Alternatively, the resistors R1-4 may be mounted on the circuit board or anywhere else inside or outside the case.

Figure 5:
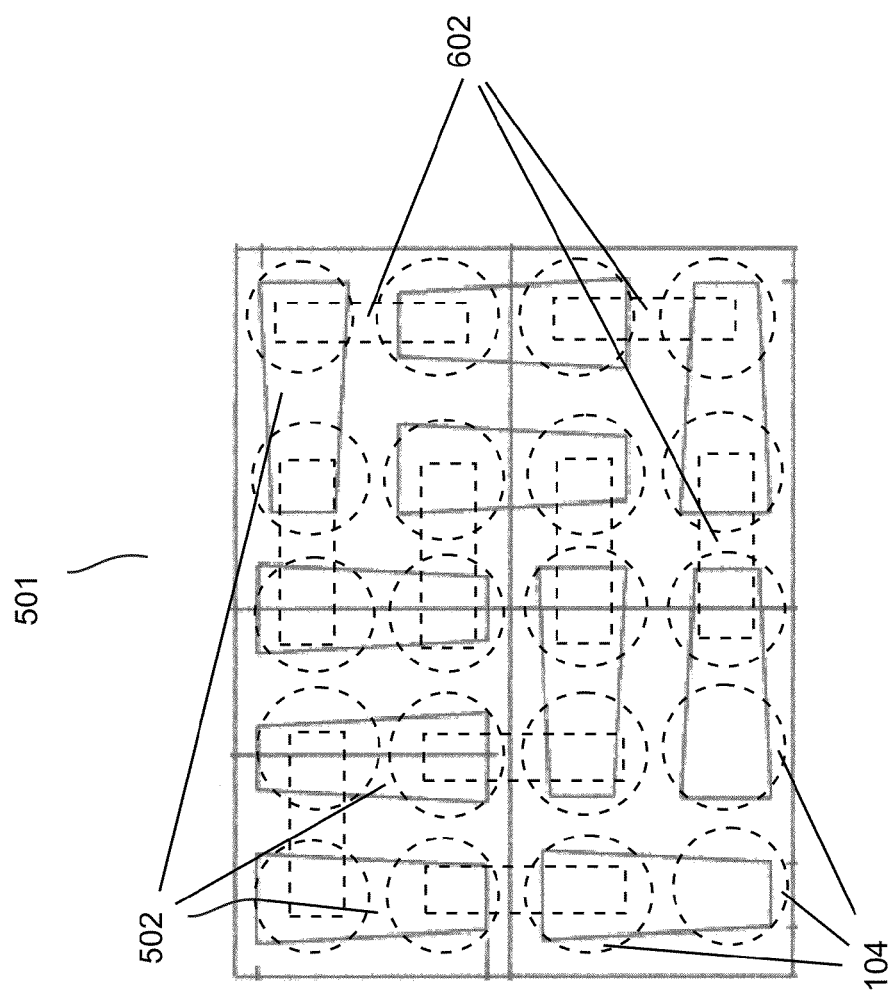
FIG. 5 shows an embodiment of the panel with conductive areas allowing for the at least one used battery to be connected in series.

The at least one battery in the case may form a series of batteries that are in contact with both the panel and circuit board. See FIG. 2. FIG. 5 shows an embodiment of panel 501 with conductive areas 502 allowing for the at least one used battery to be connected in series. The panel may be flexible so that differences in battery heights may be accounted for. The compressive insert may be foam based or may comprise any other material(s) that provide a spring-like capability that forces the battery ends onto the respective conductive lines/paths that exist on the panel and circuit board.

FIG. 6 shows an embodiment of both sides of the circuit board, allowing for conductive lines 602 for example to form a series configuration of the at least one used batteries. Side B shows the locations of the leads 603 that connect to the end of the series connected used at least one battery at the lower right of the figure. The components of the charging circuit and protective circuit may be located in any portion of the circuit board as one skilled in the art will recognize. The exemplary figures listed herein are not intended to be limiting versions of the invention and any other configuration or location for any component listed herein is in keeping with the spirit of the invention. The circuit board may utilize any type of material including but not limited to epoxy based substrate or cardboard or any other type of material utilized in constructing circuit boards.

Figure 7:
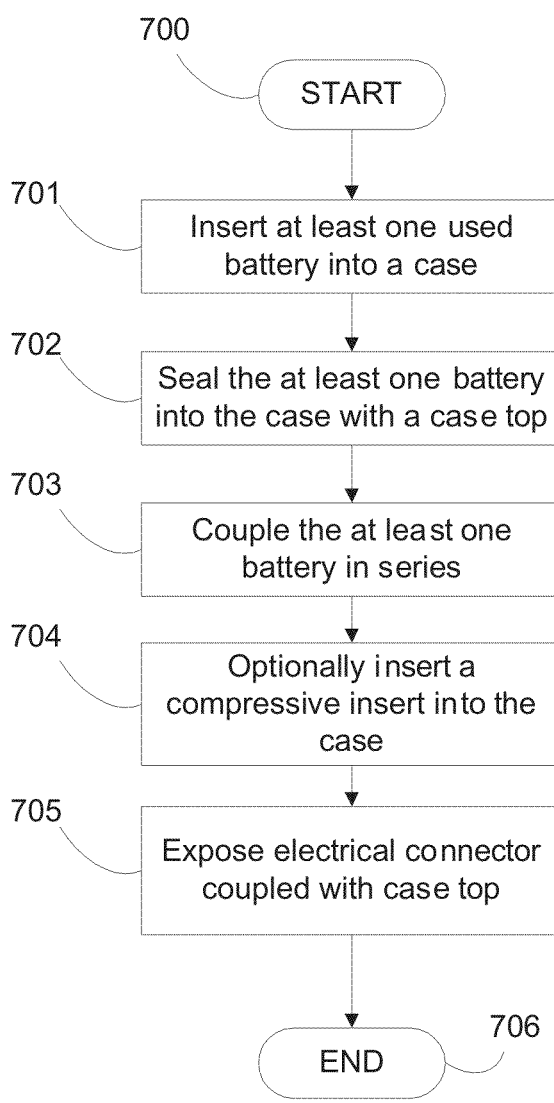
FIG. 7 shows a flowchart of an embodiment of a method for utilizing an embodiment of the invention.

FIG. 7 shows a flowchart of an embodiment of a method for utilizing an embodiment of the invention. Processing starts at 700. At least one used battery is inserted into a case at 701. The case is sealed at 702, enclosing the at least one used battery inside the case. The batteries are connected in series at 703. Optionally, a compressive insert may be inserted into the case at 704 (note that the order of the steps listed herein is not limiting and any order may be applied). An electrical connector is exposed at 705 from the case top and the apparatus is thus ready for use at 706.

Figure 8:
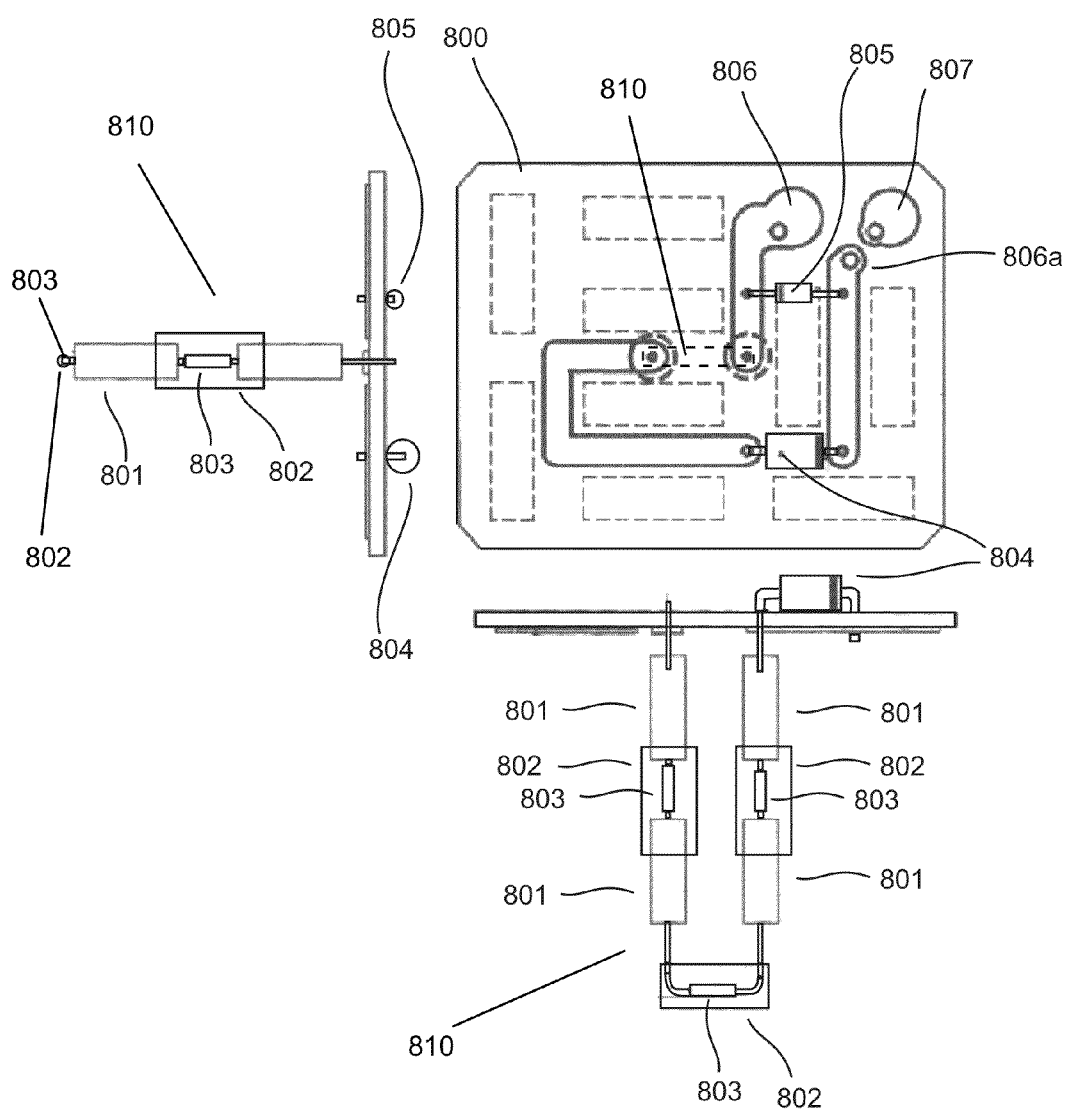
FIG. 8 shows an embodiment of the circuit board of FIG. 6 with protection circuitry of FIG. 4 included.

FIG. 8 shows an embodiment of the circuit board of FIG. 6 with protection circuitry of FIG. 4 included. Side B of FIG. 6 (top) is shown rotated 180 degrees in the upper right portion of the figure. The left portion of the figure is the side view from the left side of the circuit board. The bottom right portion of the figure is a front view of the circuit board, also showing the components of the protection circuitry of FIG. 4. Circuit board 800 comprises 4 two Watt, 1 Ohm resistors labeled 801 (see front view at bottom right of figure). Resistors 801 are coupled with splices 803 and are configured within heat shrink 802. The heat shrink may extend for the entire portion of the resistor group beneath the top of circuit board 800 and may comprise a material that is thermally conductive, yet electrically insulating. Regardless, the batteries may be utilized to provide a heat sink for the power is generated through the resistors as current flows to a target battery. Diode 804 corresponds to diode D1 of FIG. 4 and allows current to flow to a target battery through resistors 801. Diode 805 allows current to flow into the used batteries and is generally a lower current carrying diode than diode 804, although any diodes may be utilized that allow for enough current to charge the target battery and used batteries. Positive contacts 806 (and 806a) expose the positive portion of the used batteries to allow for coupling with a target battery along with negative contact 807.

In addition, the apparatus may comprise an optional switch that allows for manual connection of the at least one used battery to the target battery. The switch may also be used to connect the target battery to an LED to display a status indicator showing whether the target battery comprises a sufficient charge to warrant an attempt to start the vehicles engine that is coupled to the target battery for example. The apparatus may also comprise a charging circuit and the switch may be used in any combination with the connection to the target battery or LED or charging circuit. Alternatively, in a non-switch embodiment, the electrical circuit in the apparatus automatically charge the target battery or the at least one used battery depending on the voltages presented to the apparatus.

Although any type of the at least one used battery may be utilized, non-rechargeable alkaline batteries may be utilized in a limited number of recharge cycles. If carefully charged, non-rechargeable alkaline batteries may comprise the at least one used battery of the apparatus. Whether recharged or not, if each of the at least one used battery comprises a charge of 1.2 volts or over, then generally the battery comprises enough voltage to be used in embodiments of the invention. This allows for batteries at the end of their life to be utilized in an application where normally these batteries would be discarded.

Figure 9:
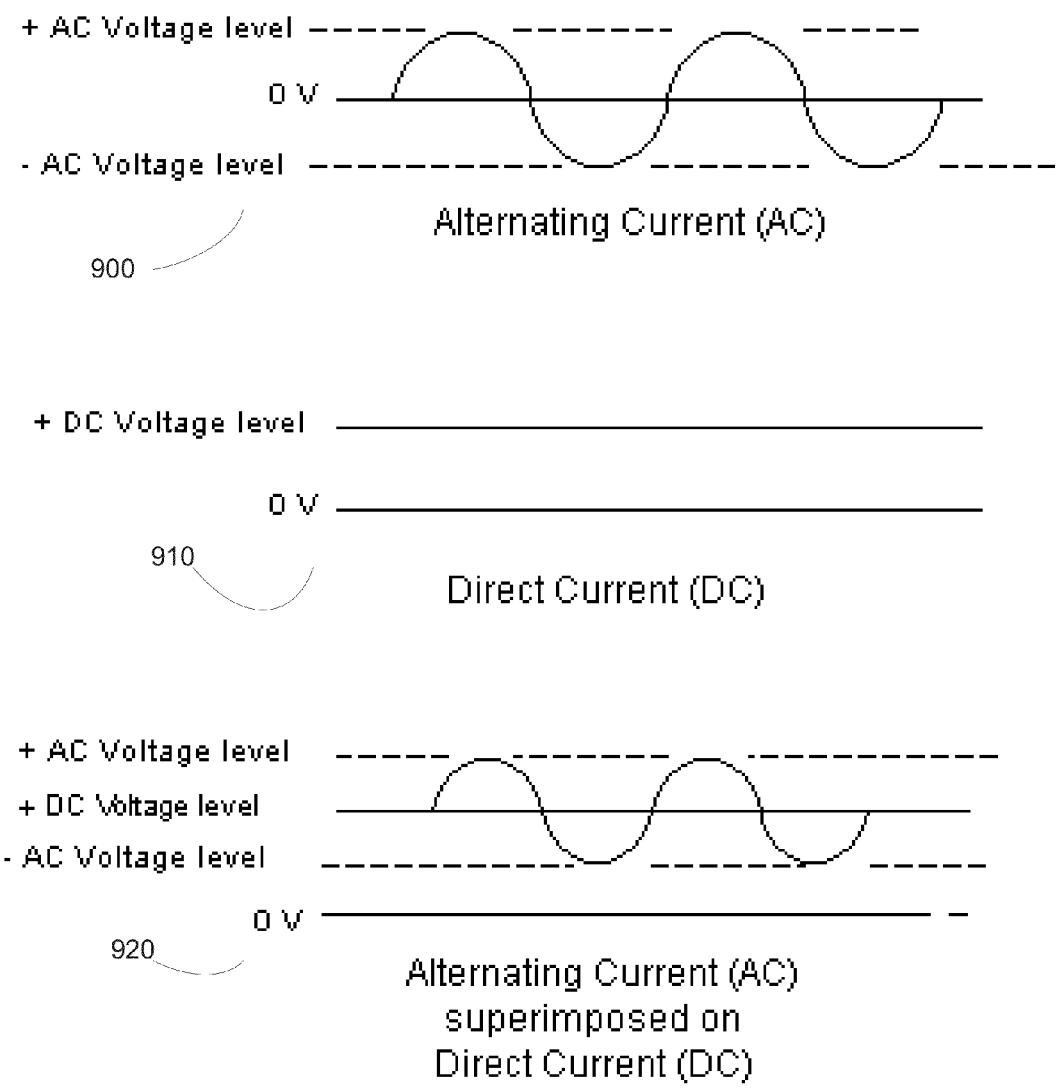
FIG. 9 shows a waveform combination of Direct Current and Alternating Current used to allow charging of batteries in one or more embodiments.
Figure 10:
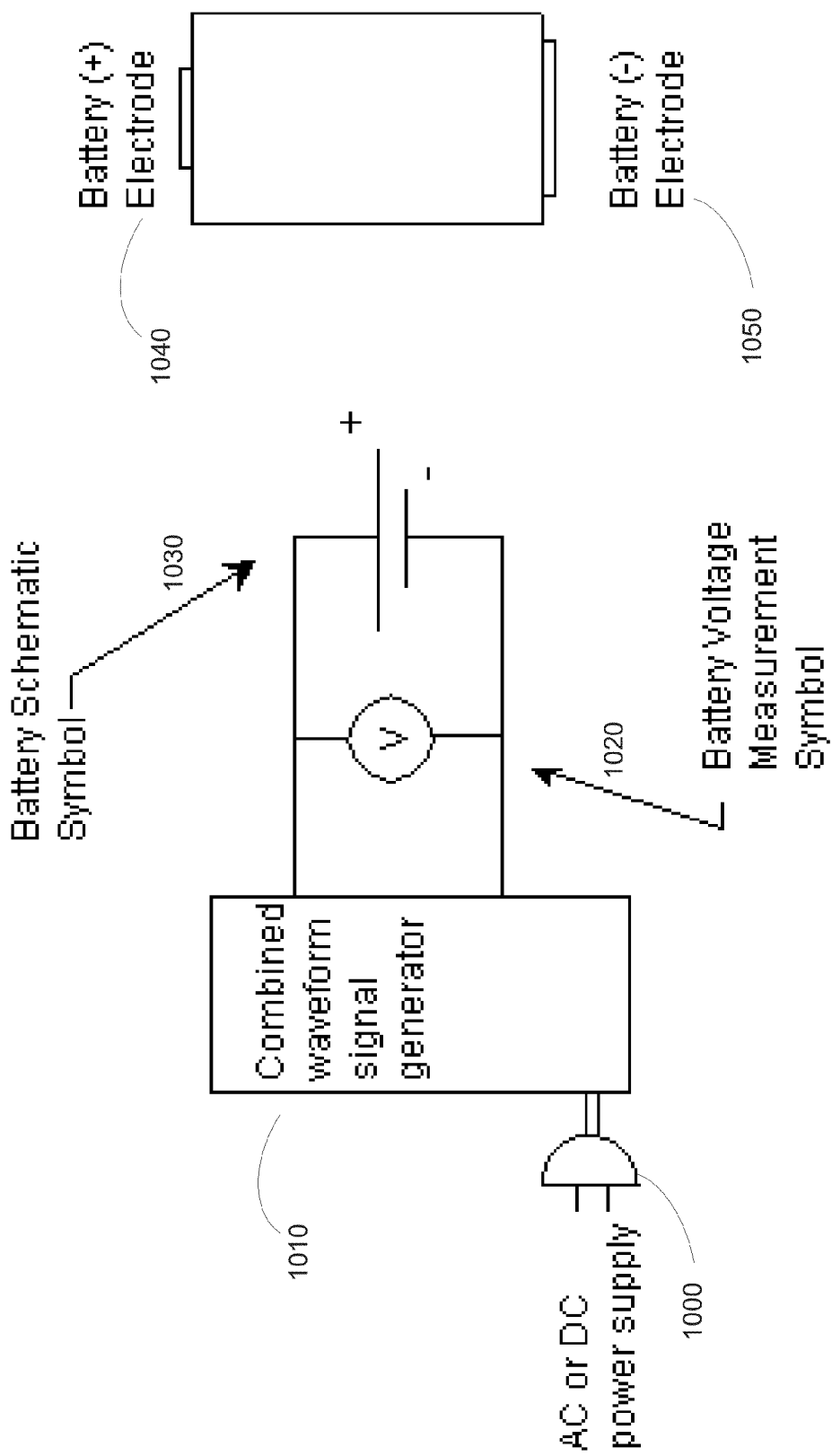
FIG. 10 shows an exemplary charging diagram employing the method of FIG. 9 is shown for one or more embodiments.

FIGS. 9 and 10 illustrate a charging technology that will recharge the typical alkaline batteries which are labeled to have the potential to explode or leak if recharged. The recharging may be performed safely with little or no discernable heat generation. Once the recharge is complete the battery may be inspected to determine that no leak has occurred and the battery may then be reused instead of disposed.

A combined waveform, as shown in FIG. 9, may be used in a charging system for charging alkaline batteries. The system combines Direct Current (DC), see graph 910 used to charge a DC battery with Alternating Current (AC), see graph 900, which perform chemical compound ion reversals at a sufficient speed to allow the DC to penetrate the layers of stratified charges created in the alkaline battery during normal use discharge. These stratified charge layers normally act as resistances to DC charging when standard DC battery chargers are employed in an attempt to recharge alkaline batteries. The stratified layers may act as capacitors to DC, not allowing them to pass the charged layer, but rather resist the DC and create heat and resulting pressure that can eventually leak.

The combination of the signals, see graph 920, results in a superposition of one signal over the other, thus allowing for DC to pass the layer and affect the reversal of the deepest chemical compounds. The result is that the battery may be opened up to charging and allows safe charging to occur.

This process is not limited to the circuit used in current charging demonstrations, but may be affected by many like circuits producing effective charging signals. The one thing in common in all circuits utilizing this technology is the mixture of AC and DC.

An exemplary charging diagram employing this method is shown in FIG. 10, though other signal combinations in the nature of this approach will also have the desired effect. AC or DC power supply 1000 is shown connecting to combined waveform signal generator 1010, which is electronically coupled to positive battery electrode 1040 and negative battery electrode 1050. Battery voltage measurement symbol 1020 and battery schematic symbol 1030 are also shown. A device employing one or more embodiments of the charging method represented by the diagram of FIG. 10 may be used to recharge the alkaline batteries for use in the invention as herein described.

While the invention herein disclosed has been described by means of specific embodiments and applications thereof, numerous modifications and variations could be made thereto by those skilled in the art without departing from the scope of the invention set forth in the claims.

What is claimed is:

1. A battery charging apparatus comprising:
   a case having a bottom surface and a vertical portion attached to the bottom surface in a substantially perpendicular configuration that defines a volume of space above the bottom surface, and dimensions defining an edge at the top of the vertical portion;
   a case top having an edge with dimensions matching the dimensions of the edge of at the top of the vertical portion of the case, wherein the edge of the case top is configured to removably couple to the edge of the case to sealably enclose the space within the case;
   a plurality of batteries placed within the case in a vertical manner and with adjacent positions with respect to each other so that each battery in the plurality is adjacent to at least two other batteries in the plurality, wherein each battery in the plurality has a positive connection at a first end and a negative connection at the opposite end, wherein batteries in the plurality are disposed in opposing configurations so that batteries in the plurality having positive connections facing upwards are next to neighboring batteries with negative connections facing upwards;
   a circuit board placed beneath the case top and above the plurality of batteries and in contact with connections facing upwards on the plurality of batteries;
   a circuit panel placed above the bottom surface of the case and below the plurality of batteries and in contact with connections facing downwards on the plurality of batteries, the circuit board and circuit panel connecting the plurality of batteries electrically in series by circuitry; and
   an electrical connector, the electrical connector having a positive lead and a negative lead coupled with the plurality of batteries and providing electrical current from the plurality of batteries to an interface with a target battery.

2. The battery charging apparatus of claim 1, wherein the interface with a target battery comprises a lighter plug.

3. The battery charging apparatus of claim 1, wherein the interface with a target battery comprises leads to fit on the target battery.

4. The battery charging apparatus of claim 1, wherein the circuitry that connects the plurality electrically in series further comprises a charging circuit having a switch, which, when set to a back position, allows current to flow from the target battery through an inductor regulated by a voltage regulator to the plurality of batteries.

5. The battery charging apparatus of claim 4, wherein the switch, when set to a front position, allows current to flow from the plurality of batteries to the target battery.

6. The battery charging apparatus of claim 1, further comprising a status circuit, the status circuit including a light, the light illuminating when the target battery has a voltage greater than a threshold amount.

7. The battery charging apparatus of claim 1, further comprising a protection circuit, the protection circuit limiting the current flow to and from the plurality of batteries, the protection circuit having at least one resistor in series with the positive lead.

8. The battery charging apparatus of claim 7, wherein the at least one resistor is enclosed in a thermally conductive, electrically insulating material.

9. The battery charging apparatus of claim 7, wherein the at least one resister is mounted on the circuit board.

10. The battery charging apparatus of claim 1, wherein the circuit board comprises an epoxy based substrate.

11. The battery charging apparatus of claim 1, further comprising a compressive insert within the case, the compressive insert forcing the plurality of batteries within the case into contact with the circuit board and the circuit panel.

12. The battery charging apparatus of claim 1, wherein the plurality of batteries comprises AA batteries.

13. The battery charging apparatus of claim 1, wherein the plurality of batteries comprises batteries from the group consisting of alkaline/alkaline manganese batteries, zinc carbon/carbon zinc batteries, zinc air batteries, silver oxide/silver batteries, lithium batteries, nickel cadmium batteries, nickel metal hydride batteries, lithium ion batteries, and small sealed lead acid batteries.

14. The battery charging apparatus of claim 1, wherein the target battery comprises an automobile battery.

15. A battery charging apparatus comprising:
   a case having a bottom surface and a vertical portion attached to the bottom surface in a substantially perpendicular configuration that defines a volume of space above the bottom surface, and dimensions defining an edge at the top of the vertical portion;
   a case top having an edge with dimensions matching the dimensions of the edge of at the top of the vertical portion of the case, wherein the edge of the case top is configured to removably couple to the edge of the case to sealably enclose the space within the case;
   a plurality of batteries placed within the case in a vertical manner and with adjacent positions with respect to each other, wherein each battery in the plurality has a positive connection at a first end and a negative connection at the opposite end, wherein batteries in the plurality are disposed in opposing configurations;
   a circuit board placed within the case and in electrical contact with the plurality of batteries;
   a circuit panel also placed within the case and in electrical contact with the plurality of batteries such that the circuit board and circuit panel connect the plurality of batteries electrically in series by circuitry; and an electrical connector, the electrical connector having a positive lead and a negative lead coupled with the plurality of batteries and providing electrical current from the plurality of batteries to an interface with a target battery.

16. A battery charging apparatus comprising:

a case having a bottom surface and a vertical portion attached to the bottom surface in a substantially perpendicular configuration that defines a volume of space above the bottom surface, and dimensions defining an edge at the top of the vertical portion;

a case top having an edge with dimensions matching the dimensions of the edge of at the top of the vertical portion of the case, wherein the edge of the case top is configured to removably couple to the edge of the case to sealably enclose the space within the case;

a plurality of batteries placed within the case in a vertical manner and with adjacent positions with respect to each other so that each battery in the plurality is adjacent to at least two other batteries in the plurality, wherein each battery in the plurality has a positive connection at a first end and a negative connection at the opposite end;

a circuit board placed beneath the case top and above the plurality of batteries and in contact with connections facing upwards on the plurality of batteries;

a circuit panel placed above the bottom surface of the case and below the plurality of batteries and in contact with connections facing downwards on the plurality of batteries, wherein the circuit board and circuit panel connects the plurality of batteries electrically by circuitry; and an electrical connector, the electrical connector having a positive lead and a negative lead coupled with the plurality of batteries and providing electrical current from the plurality of batteries to an interface with a target battery.

* * * * *